United States Patent
Poshusta et al.

(10) Patent No.: US 10,505,228 B2
(45) Date of Patent: Dec. 10, 2019

(54) METHOD FOR DRYING ELECTROLYTE SOLUTION

(71) Applicant: Synthio Chemicals, LLC, Boulder, CO (US)

(72) Inventors: Joseph Carl Poshusta, Broomfield, CO (US); Jerry Lynn Martin, Superior, CO (US)

(73) Assignee: Synthio Chemicals, LLC, Boulder, CO (US)

( * ) Notice: Subject to any disclaimer, the term of this patent is extended or adjusted under 35 U.S.C. 154(b) by 121 days.

(21) Appl. No.: 15/884,196

(22) Filed: Jan. 30, 2018

(65) Prior Publication Data

US 2018/0219260 A1    Aug. 2, 2018

Related U.S. Application Data

(60) Provisional application No. 62/451,931, filed on Jan. 30, 2017.

(51) Int. Cl.
| | | |
|---|---|---|
| *H01M 4/00* | (2006.01) | |
| *H01M 10/0569* | (2010.01) | |
| *H01M 10/0568* | (2010.01) | |
| *H01M 10/0525* | (2010.01) | |
| *B01D 5/00* | (2006.01) | |
| *B01D 3/10* | (2006.01) | |
| *B01D 15/08* | (2006.01) | |

(52) U.S. Cl.
CPC .......... *H01M 10/0569* (2013.01); *B01D 3/10* (2013.01); *B01D 5/006* (2013.01); *H01M 10/0525* (2013.01); *H01M 10/0568* (2013.01); *B01D 15/08* (2013.01); *H01M 2300/0028* (2013.01)

(58) Field of Classification Search
CPC ....................................................... H01M 4/00
See application file for complete search history.

(56) References Cited

U.S. PATENT DOCUMENTS

2013/0068991 A1* 3/2013 Sato .................... C01B 21/0935
252/62.2

* cited by examiner

*Primary Examiner* — Jacob B Marks
(74) *Attorney, Agent, or Firm* — Don D. Cha; HDC IP Law, LLP

(57) ABSTRACT

The present invention provides a method for producing low-water-content electrolyte solutions. In particular, the present invention provides a method of removing water from a liquid solution comprising a non-aqueous solvent, a hygroscopic metal salt and water. It also provides a method for producing a low-water content electrolyte solution without isolation of the metal salt. The method of the invention is useful in producing low water content electrolyte solutions for batteries such as lithium- or lithium-ion batteries.

28 Claims, 2 Drawing Sheets

METHOD FOR DRYING ELECTROLYTE SOLUTION

CROSS-REFERENCE TO RELATED APPLICATIONS

This application claims the priority benefit of U.S. Provisional Application No. 62/451,931, filed Jan. 31, 2017, which is incorporated herein by reference in its entirety.

FIELD OF THE INVENTION

The present invention relates to the production of low-water-content electrolyte solutions in general. It is particularly applicable to the production of low-water-content electrolytes compromising alkali (e.g., lithium, sodium, potassium, or a combination thereof) salts and non-aqueous solvents for use in alkali metal or alkali-ion (e.g., lithium- or lithium-ion) batteries.

BACKGROUND OF THE INVENTION

Electrolytes for lithium- and lithium-ion batteries typically require non-aqueous electrolytes with low water content in order to obtain acceptable calendar and cycle life. Commercial electrolytes for lithium-ion batteries typically specify water contents of no more than 500 parts per million (ppm) by weight, typically no more than 400 ppm, often no more than 300 ppm, still more often no more than 200 ppm, yet still more often no more than 100 ppm, and most often below 50 ppm by weight. These electrolytes typically comprise one or more non-aqueous or aprotic solvents and one or more lithium salts, such as lithium hexafluorophosphate ($LiPF_6$). A common electrolyte production method includes removing the water from a solvent mixture and then mixing in a lithium salt powder. It is difficult and expensive to remove water from the electrolyte once the lithium salt is combined with the solvent, so the lithium salt added to the electrolyte must have very low water content, typically less than 100 ppm.

Recently, battery manufacturers have begun to use lithium bis(fluorosulfonyl)-imide ("LiFSI") as an alternative to the more commonly used $LiPF_6$ salt in electrolytes for lithium- and lithium-ion batteries. LiFSI salts provide higher conductivity solutions, and are more stable against hydrolysis, which improves battery lifetime and performance at elevated temperatures. NaFSI salts have also been reported for sodium-ion batteries, and KFSI is a candidate for use in both potassium and sodium-ion batteries.

Production of dry, free-flowing alkali metal salts of bis(fluorosulfonyl)imide with low water content is technically challenging. LiFSI is deliquescent (i.e., it can absorb enough water vapor from the air to form a liquid solution), and therefore all handling is typically performed in closed systems or dry rooms with very low humidity. In addition, LiFSI/water mixtures are not stable at high temperatures, for example, 50% LiFSI/water mixtures can decompose violently above 120° C. More importantly, concentrated LiFSI/water mixtures can form complexes with extremely low vapor pressure. Hydrolysis of the LiFSI salt proceeds rapidly at temperatures above 60° C., so it is not practical to heat water-containing LiFSI powder or solutions to higher temperatures in order to speed the water removal. This makes final removal of water from LiFSI powders complex and expensive.

Prior art methods for drying LiFSI salts include vacuum drying, anti-solvent precipitation, and water vapor stripping with dry gas. As an example, U.S. Pat. No. 9,079,780, issued to Sato (the "Sato '780 Patent"), describes a method for producing LiFSI using a combination of dry gas and vacuum drying in a short path distillation apparatus. U.S. patent application publication number 2013/0323155A1, filed by Tsubokura, describes production of dry LiFSI by precipitating the powder from a concentrated solution using an anti-solvent such as methylene chloride. These prior art methods all suffer from high energy use, inefficient solvent use, low yield (typically <80%, often <60%) or very long drying times. State-of-the-art methods for preparing lithium salts for use in electrolytes generally involve crystallization and drying steps to produce free-flowing powders. Electrolyte preparation requires handling these powders without introducing water, which increases the cost and complexity of electrolytes.

Attempts to remove water from LiFSI have proven extraordinarily difficult using conventional methods. Simply removing water as a vapor by evacuating LiFSI/water mixtures at temperatures <40° C. are not practical due to the very long time and high energy use required. Example 3, from Sato's '930 patent describes a 7-day drying time in a shelf-type vacuum dryer to obtain a powder. As LiFSI becomes more concentrated in water, the vapor pressure of the water falls far below that predicted by the ideal case of Raoult's law. This effect was demonstrated by He et al. (U.S. Pat. No. 9,268,831) for other solvents. While heating the concentrated solution would theoretically raise the solvent vapor pressure, LiFSI will quickly consume water by hydrolysis at elevated temperatures and generate acids of fluoride, sulfate, and sulfamate, which are undesirable in LiFSI electrolytes.

Most prior art processes for producing dry lithium salts require the use of volatile organic solvents. If these solvents are not components of the final electrolyte, they must be removed from the salt before final electrolyte blending. Removal of these solvents is time consuming, expensive, and presents both safety concerns from the handling of flammable solvents and environmental hazards due to potential release of volatile organic compounds into the environment.

Therefore, there is a clear unmet need for simplified methods of delivering lithium salts for electrolytes that avoids the need to handle solids and provides an electrolyte of high purity and low water content.

SUMMARY OF THE INVENTION

Some aspects of the invention overcome prior obstacles to the production of dry (low water content), high purity electrolyte solutions comprising lithium salts and non-aqueous solvents. Methods of the invention provide a process for producing electrolyte solutions with low water content in a cost-effective and safe manner, with reduced solvent use and increased yield.

One particular aspect of the invention provides a method for producing an aprotic electrolyte solution comprising a hygroscopic alkali metal salt. The method generally includes admixing the following components: (i) a liquid solution comprising an acidic form of said hygroscopic alkali metal salt and a first solvent, (ii) an alkali metal base, and (iii) an aprotic electrolyte solvent. The resulting mixture produces a vapor which includes water, a first solvent or a combination thereof. The vapor is then removed from the mixture to reduce the amount of water to produce the aprotic electrolyte solution. The resulting electrolyte solution typically contains no more than 500 parts per million (ppm) of water by weight, typically no more than 400 ppm, often no more than 300 ppm, still more often no more than 200 ppm, yet still more often no more than 100 ppm, and most often below 50 ppm.

Yet in other aspects of the invention, the method includes adding the electrolyte solvent to the mixture to maintain the concentration of the alkali metal electrolyte below the concentration where the vapor pressure of the resulting solution mixture is more than one-tenth of the product of the vapor pressure of the pure aprotic electrolyte solvent and its mole fraction in the solution mixture.

Another aspect of the invention provides a simplified method for producing secondary battery electrolytes without the need to isolate a dry alkali metal salt. By avoiding the drying and crystallizing steps required of prior art processes, the present invention provides simpler, less expensive, and high-yield process for electrolyte production. Furthermore, by eliminating the need to handle dry powders, the method of the invention reduces the cost and complexity of electrolyte production, as pumping and mixing liquid solutions utilizes simpler and less expensive equipment than that required to handle dry powders.

In some prior art processes, for example the process described by Poshusta in U.S. Pat. No. 8,722,005, production of salts of bis(fluorosulfonyl)imide (FSI) begins by synthesis of hydrogen bis(chlorosulfonyl)imide (HCSI), which is then fluorinated by anhydrous hydrogen fluoride (HF) to yield hydrogen bis(fluorosulfonyl)imide (HFSI). This acid form of FSI provides for simple synthesis of any FSI salt by neutralization with the appropriate metal base. For example, LiFSI can be easily prepared by neutralization of HFSI with LiOH, and NaFSI can be produced by neutralization of HFSI with $Na_2CO_3$. As a proton donating acid, HFSI will produce water on neutralization with metal bases. The presence of water is problematic in the operation of lithium-ion batteries as its presence causes electrochemical instability and reaction of electrolytes with other battery components. It is therefore very important to produce LiFSI that is substantially free of water.

Still another aspect of the invention provides a simple and cost-effective process for removing water from solvent/salt solutions, thereby enabling the use of liquid acid precursors to lithium salts such as HFSI and hydrogen bis(trifluoromethylsulfonyl)imide (HTFSI). These liquid precursors enable simpler salt production processes than conventional processes that use solid salt intermediates like KFSI or KTFSI followed by cation exchange.

The invention also provides a method for producing high-purity LiFSI dry powder. Such a method includes producing a low-water content electrolyte solution comprising LiFSI as described herein. Thereafter, the LiFSI can be precipitated from the solution using a low-polarity antisolvent (i.e., precipitation solvent) such as hexane, dichloromethane or toluene. In this manner, the water removal step can be accomplished efficiently using the methods described herein, and then various methods known to those skilled in the art can be used to either remove the solvent or precipitate the LiFSI from the solution.

The invention also includes a method for producing a non-aqueous electrolyte solution comprising LiFSI, NaFSI, KFSI or a combination thereof. In addition, the invention also provides dry salts thereof, which can be produced using the methods disclosed herein. Such non-aqueous electrolyte solutions are useful in batteries, including lithium, sodium and/or potassium batteries. By mixing the low-water-content electrolyte solutions of this invention with other salts, co-solvents and additives, a formulated electrolyte for a battery can be easily prepared.

The invention also provides a process for producing a low-water-content alkali metal electrolyte solution from the corresponding acidic electrolyte material such as HFSI and hydrogen bis(trifluoromethylsulfonyl)imide (HTFSI). In one particular embodiment, the process of the invention includes contacting metal carbonates or metal hydroxides with the acidic electrolyte material in the presence of suitable battery solvents. The process can also include removing the water without isolating the metal salt of the electrolyte material. Compared to conventional methods of producing low-water-content electrolytes, the methods disclosed here eliminate process steps (e.g., isolation of solid metal electrolyte material), require smaller and less complex equipment, and provide higher yield.

Methods of the invention are particularly useful for providing a low water content solution of a compound of the formula:

$$R^1-SO_2-N(M^1)-SO_2-R^2 \qquad I$$

where $M^1$ is an alkali metal (such as sodium, potassium, lithium, rubidium, cesium, or francium), and each of $R^1$ and $R^2$ is independently selected from the group consisting of fluoride and a fluorinated $C_{1-6}$ alkyl.

DETAILED DESCRIPTION OF THE INVENTION

Figure 1:
FIG. 1 is a schematic illustration of one particular embodiment of the invention for removing water from LiFSI/solvent solutions.

Unless otherwise specified, all concentrations are on a weight basis; i.e. 50 ppm means 50 parts by weight out of 1,000,000 parts and 50% means 50% by weight. As used herein, the terms "low water content," "free of water," "anhydrous," "water free," "dry organic solvent (or solution)," "dry solvent (or solution)," and "non-aqueous solvent (or solution)" are used interchangeably herein and refer to a composition having water content of about 1,000 ppm or less, typically about 500 ppm or less, often 250 ppm or less, more often about 100 ppm or less, and most often about 50 ppm or less. In some embodiments, the non-aqueous solvent is an aprotic solvent. The term "aprotic" when referring to a solvent or a solution means the amount of protic solvent present is about 1,000 ppm or less, typically about 500 ppm or less, often 250 ppm or less, more often about 100 ppm or less, and most often about 50 ppm or less. The term "about" when referring to a numeric value refers to ±20%, typically ±10%, often ±5% and more often ±2% of the numeric value. Although the terms "first", "second", and the like are used to describe various components, these components are not confined by these terms. These terms are merely used to distinguish one component from the other components. Therefore, a first component may be a second component in the present disclosure.

Unless the context requires otherwise, the term "electrolyte" refers to a chemical compound (typically a salt) that conducts electricity by changing into ions when melted or dissolved into a solution. An example of an electrolyte is sodium chloride and a compound of Formula I. The term "electrolyte solution" refers to a mixture of an electrolyte, solvent and optionally additives that can be used as a battery.

Throughout this disclosure, unless the context requires otherwise, the term "removal of water" means the resulting solution has water content of about 1,000 ppm or less, typically about 500 ppm or less, often about 300 ppm or less, more often about 100 ppm or less, and most often about 50 ppm or less. Alternatively, the term "removal of water" means reducing the water content by at least about 50%, typically at least about 70%, often at least about 80%, often at least 90%, and more often at least 95% from the starting liquid solution.

Through extensive study, experimentation and development, the inventors have discovered that while a compound of Formula I:

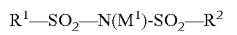

$$R^1-SO_2-N(M^1)-SO_2-R^2 \quad\quad I$$

(such as LiFSI) is very difficult to dry as a powder or a concentrated solution due to the extremely low vapor pressure of water above the powder or concentrated solution, water can be removed at a low temperature if the salt concentration is maintained below a critical value. Without being bound by any theory, it is believed that at sufficiently high salt concentrations, nearly all the solvent molecules are associated with salt ions, and only a small fraction of solvent molecules are free.

Prior art processes for drying LiFSI by removing water from a concentrated solution are slow due to the low vapor pressure associated with the bound solvent. For example, the Sato '780 Patent states "A difficulty of removal of the reaction solvent from the reaction solution because of a significant interaction between the alkali metal salt of fluorosulfonyl imide and the solvent occurs after a time a time point at which the amount of the reaction solvent is 150% by mass or less based on [the mass] of the alkali metal salt of fluorosulfonyl imide." Surprisingly and unexpectedly, the inventors have found that water vapor can be removed from dilute solutions more than 100 times faster than with prior art methods using the process disclosed herein. This two-order-of-magnitude increase in the drying rate for a 10% change in solvent concentration is surprising and unexpected. In addition, the process of the invention has significantly higher yield of compound of Formula I (e.g., LiFSI) than conventional processes, approaching 100% yield. This increase in yield is of high commercial value, and has not been obtained in prior art processes, despite intense research and development by multiple groups worldwide.

One particular aspect of the invention provides a method for producing a non-aqueous electrolyte solution comprising a hygroscopic alkali metal salt electrolyte (e.g., a compound of Formula I). Such a method includes:
(a) admixing (i) an acid form of an electrolyte (ii) an alkali metal base, and (iii) a non-aqueous solvent under conditions sufficient to produce a solution mixture comprising:
said alkali metal salt electrolyte,
water, and
an alkali metal salt produced from a reaction between said acid form of said electrolyte and said alkali metal base; and
(b) removing a vapor comprising water from said solution mixture to produce said non-aqueous electrolyte solution.

In some embodiments, the non-aqueous solvent is selected from the group consisting of an acyclic carbonate, a cyclic carbonate, an acyclic ether, a cyclic ether, an ionic liquid, water and a mixture thereof. Still in other embodiments, the method further includes the step of adding additional amount of the non-aqueous solvent to the non-aqueous electrolyte solution produced in the step (b) and repeating the step (b). The additional amount of non-aqueous solvent can be added continuously or batch-wise.

Yet in other embodiments, the non-aqueous solvent can be recovered from the vapor and reused. Recovery of the non-aqueous solvent from the vapor includes removing water from the vapor to produce a low-water content non-aqueous solvent. Recovery can also include condensing the vapor prior to or after removing water. Water can be removed from the vapor (prior to and/or after condensation of the vapor) using any of the methods known to one skilled in the art including, but not limited to, phase separation, distillation, adsorption, extraction, membrane separation, chemical reaction, and a combination thereof.

Typically, the method of the invention is used to produce the non-aqueous electrolyte solution having no more than 1000 ppm, typically about 500 ppm or less, often 250 ppm or less, more often about 100 ppm or less, and most often about 50 ppm or less of water by weight.

In some embodiments, the amount of non-aqueous electrolyte solvent added to the admixture is sufficient to maintain the hygroscopic alkali metal salt concentration below the concentration where the vapor pressure of the resulting solution mixture is more than one-tenth of the product of the vapor pressure of the pure non-aqueous electrolyte solvent and its mole fraction in the solution mixture. Still in another embodiment, the concentration of the alkali metal salt electrolyte is maintained such that the resulting vapor pressure is near or consistent with that predicted by Raoult's law, i.e., within about ±25%, typically within about ±10%, and often within about ±5%. Briefly, Raoult's law states that the partial vapor pressure of each component of an ideal mixture of liquids is equal to the vapor pressure of the pure component multiplied by its mole fraction in the mixture. Alternatively, Raoult's law states the relative lowering of vapor pressure of a dilute solution containing nonvolatile solute is equal to the mole fraction of solute in the solution. Without being bound by any theory, it has been found by the present inventors that an electrolyte solution vapor pressure near that predicted by Raoult's law enables vaporization of the solvent and water from the solution and subsequent drying under practical conditions, i.e., without the need for a large energy consumption or drying time. If the salt concentration is too high, the solution vapor pressure drops below practical conditions under which the invention may be practiced.

Typical alkali metal bases include alkali metal carbonate, alkali metal hydroxide, alkali metal bicarbonate, or a combination thereof.

Another aspect of the invention provides a method for producing a non-aqueous electrolyte solution comprising a hygroscopic alkali metal salt and about 1000 ppm or less of water. Such a method includes:
(a) admixing (i) a non-aqueous electrolyte solvent and (ii) a liquid solution comprising said hygroscopic alkali metal salt and water under conditions sufficient to produce an admixture solution and a vapor comprising said electrolyte solvent and water;

(b) removing said vapor to reduce the amount of said water from said admixture solution to produce said electrolyte solution;

(c) adding an additional amount of said non-aqueous electrolyte solvent to said electrolyte solution produced in said step (b), wherein the amount of said non-aqueous-electrolyte solvent added is sufficient to maintain said alkali metal electrolyte concentration below the concentration where the vapor pressure of said admixture solution is more than one-tenth of the product of the vapor pressure of the pure non-aqueous electrolyte solvent and its mole fraction in said admixture solution; and (d) repeating said steps (b) and (c) to produce said non-aqueous electrolyte solution.

It is desired that the non-aqueous electrolyte solvent that is used has a low water content. Typically, the water content of the non-aqueous electrolyte solvent used is about 1,000 ppm or less, often about 500 ppm or less, more often about 250 ppm or less, and most often about 100 ppm or less. The electrolyte solvent can be recovered from the vapor and reused as described above. In some instances, the additional amount of the non-aqueous electrolyte solvent added in the step (c) can include at least a portion of the recovered electrolyte solvent. Steps (b)-(d) can be a continuous process or one or more steps can be conducted in a batch-wise process. In some embodiments, temperature of the solution is maintained at about 50° C. or less, often at about 40° C. or less throughout the entire process. Alternatively, the vapor is removed from the admixture solution at a pressure between 0.01 torr and about 500 torr. Still in another embodiment, the vapor is removed from the admixture solution at temperature between about 10° C. and about 80° C.

In one particular embodiment of the present invention, the hygroscopic alkali metal electrolyte salt (e.g., compound of Formula I) is lithium bis(fluorosulfonyl)imide ("LiFSI").

Accordingly, one specific embodiment of the invention provides a method for producing an aprotic electrolyte solution comprising lithium bis(fluorosulfonyl)-imide ("LiFSI"). Such a method includes the steps of:

(a) combining (i) hydrogen bis(fluorosulfonyl)imide ("HFSI"), (ii) an aprotic solvent, and (iii) a lithium base under conditions sufficient to produce a solution mixture comprising LiFSI and a vapor comprising water; and (b) removing said vapor from said solution mixture to produce said aprotic electrolyte solution having no more than 1000 ppm of water.

Exemplary aprotic solvents used in such a method include, but are not limited to, diethyl carbonate (DEC), ethylmethyl carbonate (EMC), ethylene carbonate (EC), acetonitrile, methanol, ethanol, and a mixture thereof. Typically, the amount of water present in the aprotic electrolyte solution is less than the total amount of water produced from the reaction between said HFSI and the lithium base. Exemplary lithium bases that are useful in this method of the invention include, but are not limited to, lithium hydroxide, lithium carbonate, lithium bicarbonate, and a combination thereof.

Other aspects of the invention provide a method for producing a non-aqueous electrolyte solution comprising one or more alkali metal salts (e.g., compound of Formula I) and a non-aqueous solvent with low water content. Water is removed from a solution of organic solvents, alkali salts and water while maintaining the salt concentration below a critical value. The process can be conducted at temperatures that do not result in excessive degradation of the alkali metal salt.

Methods and the processes of the invention can be used to produce provide electrolyte solutions having the water content of about 1000 ppm or less by weight, typically about 500 ppm or less, often about 400 ppm or less, more often about 300 ppm or less, still more often about 200 ppm or less, yet more often about 100 ppm or less, and most often about 50 ppm or less.

The invention also provides a method for producing non-aqueous electrolyte solutions by combining a low-water-content electrolyte solution with other electrolyte component(s) such as a compound of Formula I, co-solvent(s) and/or additive(s) to yield an electrolyte solution suitable for use in non-aqueous batteries. Electrolyte solutions produced by this method provide batteries with improved performance and lifetime.

In some embodiments, the electrolyte solution of the invention comprises a metal salt that is used in batteries as an electrolyte. Generally any metal salts that are useful as electrolytes can be used. In some embodiments, the metal salt is a hygroscopic metal salt, e.g., a compound of Formula I. The term "hygroscopic" means ability of a dry metal salt (i.e., having about 1000 ppm or less, typically about 500 ppm or less and often about 100 ppm or less water content) to attract (e.g., absorb and/or adsorb) water molecules from atmosphere at standard conditions (e.g., at room temperature (20° C.) at 1 atmospheric pressure). Suitable metal salts include hygroscopic metal salts that are known to one skilled in the art for use in batteries or in electrolyte solutions. In some embodiments, the metal salt is a compound of Formula I. In one particular embodiment, the metal salt is a lithium metal salt. Within this embodiment, in one particular instance the metal salt is LiFSI.

Organic solvents that can be used in the invention include any organic solvent known to one skilled in the art. Either protic or aprotic solvents can be used. In one particular embodiment, organic solvent is an aprotic solvent. Exemplary aprotic organic solvents that can be used in the invention include, but are not limited to, cyclic- and acyclic carbonates and esters. Specific examples of suitable aprotic organic solvents include, but are not limited to, acetonitrile, γ-butyrolactone, diethyl carbonate, 1,2-dimethoxyethane, dimethyl carbonate, 1,3-dioxolane, ethyl acetate, ethylene carbonate, ethyl methyl carbonate, propylene carbonate, tetrahydrofuran, methyl propionate, fluorinated carbonates, and the like. In some embodiments, the solvent that is used in the electrolyte solution of the invention comprises a mixture of two or more organic solvents and can also include one or more ionic liquids.

In some embodiments, the electrolyte solution of the invention is a lithium ion battery electrolyte solution. Such solvents for a lithium ion battery electrolyte can include the same non-aqueous solvent used in the drying process. In such cases, the need to completely (e.g., about 90% or more, typically about 95% or more, often about 98% or more, and more often about 99% or more) remove the non-aqueous solvent from the metal salt in the drying process before producing the final electrolyte can be eliminated, resulting in reduced process complexity and improved process yield.

It should be appreciated that while the invention is described in terms of lithium salts, the inventive method can be applied to other alkali metal salts, including sodium, lithium, potassium, rubidium, cesium and francium salts, and a mixture thereof. For the sake of brevity and clarity, the present invention is described herein in reference to removing water from lithium metal salts. In particular, the present invention will now be described in reference to removing water from a solution comprising LiFSI.

In one particular embodiment, the process of the invention provides removing water from a first non-aqueous solvent and LiFSI, while maintaining the concentration of the salt in a range where the vapor pressure of the mixture exceeds 0.1 torr at 50° C. The method can remove water to well below 100 ppm and without heating to temperatures that can lead to significant decomposition or hydrolysis of the LiFSI (e.g., about 10% or less, typically about 5% or less and often about 1% or less decomposition or hydrolysis).

One particular process of the invention is schematically illustrated in FIG. 1. As shown in FIG. 1, in this particular embodiment, the process removes water by adding dry solvent (e.g., a second non-aqueous solvent) to a starting liquid phase LiFSI/solvent (e.g., a first non-aqueous solvent)/water mixture and then removing the first non-aqueous solvent and water as a vapor. The first non-aqueous solvent vapor carries at least a portion of water vapor out of the solution. The second non-aqueous solvent can be fed to the process as either a liquid or a vapor, but in either case it is mixed with the starting LiFSI/solvent/water solution. If the second non-aqueous solvent is fed as a liquid, heat can be added to the LiFSI/solvent solution in order to remove solvent and water as a vapor. It should be appreciated unless otherwise stated, the term solvent in "LiFSI/solvent" refers to a first non-aqueous solvent, i.e., a solvent in which drying is desired. In some embodiments, it can be advantageous to conduct the process under reduced pressure in order to facilitate vaporization of solvent and water from the LiFSI/solvent/water solution at temperatures that avoid significant decomposition and/or hydrolysis of LiFSI. Treatment with a sufficiently dry solvent provides a solution having acceptable level of water.

Dry solvent (e.g., second non-aqueous solvent) can be any solvent that is compatible with LiFSI and water. In one particular embodiment, LiFSI is soluble in the dry solvent (e.g., second non-aqueous solvent) that is used in the drying process. In some embodiments, the dry solvent has a pure-component (at standard conditions, e.g., room temperature at 1 atmospheric pressure) vapor pressure of between 0.1 and about 760 torr, typically between 1 and about 50 torr, and often between 1 and about 17.5 torr. Yet in other embodiments, the mole ratio of LiFSI to solvent is adjusted to provide a solution vapor pressure between 0.1 and about 760 torr at between 0° C. and 80° C., typically between 1 and about 300 torr at between 10° C. and 60° C., and often between 1 and about 50 torr at between 20° C. and 50° C. Suitable solvents include, but are not limited to, polar solvents such as alcohols, acetates, nitriles, formamides, carbonates, ethers, nitrates, and amines. Specific exemplary solvents include ethanol, ethyl acetate, acetonitrile, formamide, diethyl carbonate, diethyl ether, ethyl methyl carbonate, nitromethane, and butyl amine. In addition to pure solvents, mixtures of solvents can be used, as long as the mixture exhibits the required vapor pressure.

In one particular embodiment the solvent is an acyclic carbonate (such as, but not limited to, diethylcarbonate and ethylmethylcarbonate), a cyclic carbonate (such as, but not limited to, propylene carbonate and ethylene carbonate), an acyclic ether (such as, but not limited to, 1,2-dimethoxyethane), a cyclic ether (such as, but not limited to, dioxolane and 1,4-dioxane), an ionic liquid (such as, but not limited to, 1-ethyl-3-methylimidazolium bis(fluorosulfonyl)-imide and 1-methyl-1-propylpyrrolidiunium bis(trifluoromethylsulfonyl)imide), or a mixture thereof.

Once the LiFSI/solvent mixture reaches the target water content, the remaining dry solvent can be removed by any method known to those skilled in the art. Such methods include solvent stripping with dry gas, heating at atmospheric pressure or heating under a vacuum. Combinations of these methods can be used. Alternatively, a dry LiFSI powder can be produced by adding a low-polarity anti-solvent such as toluene or dichloromethane to the LiFSI/solvent mixture to precipitate LiFSI. The term "anti-solvent" refers to a solvent that can be used to precipitate LiFSI particles from a solution.

Particularly useful solvents are those that comprise at least part of the final electrolyte mixture. For example, diethyl carbonate is a component in some commercial lithium-ion battery electrolytes. Thus, by using diethyl carbonate as the drying solvent in the process, the step of removing the drying solvent or precipitating the lithium salt can be eliminated, resulting in further simplification of the process.

Figure 2:
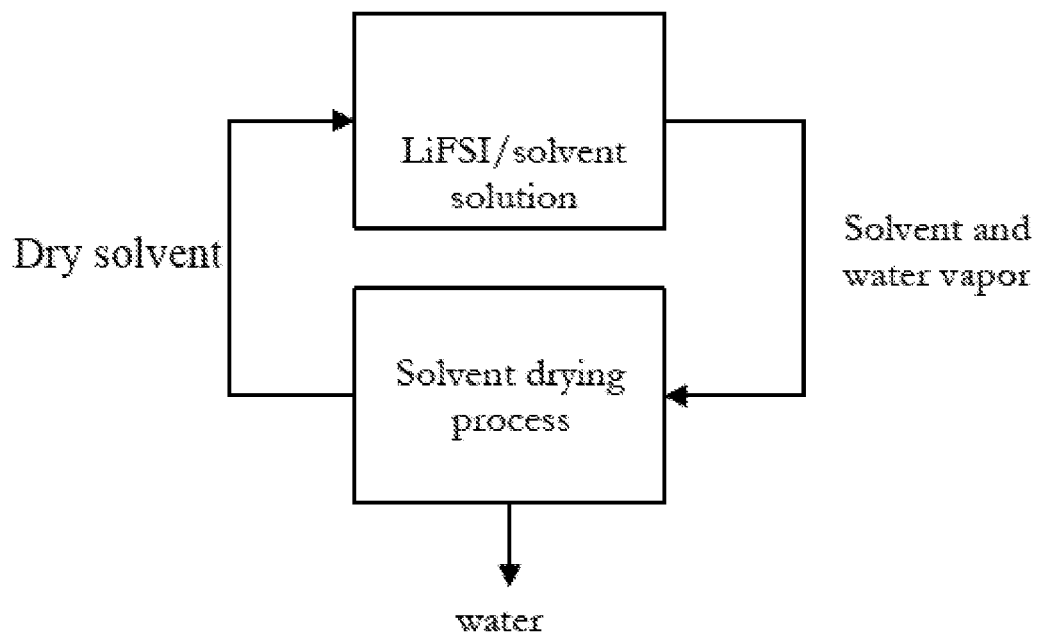
FIG. 2 is a schematic illustration of yet another embodiment of the invention for removing water from LiFSI/solvent solutions with solvent recycling.

In some embodiments, the evaporated solvent is recovered and recycled. This embodiment of the invention is schematically illustrated in FIG. 2. The drying process can be either a separate batch process where a sufficient amount of the second dry solvent is added to a batch of LiFSI/solvent, or a continuous process that recovers the evaporated solvent and dries the recovered solvent vapor before recycling, i.e., returning it to the LiFSI/solvent solution. It should be appreciated that the first non-aqueous solvent can be the same as the second non-aqueous solvent. In such a case, the second non-aqueous solvent is a dry solvent whereas the first non-aqueous solvent/salt mixture contains water.

Drying the recovered second non-aqueous solvent can be achieved either in the liquid or vapor phase. A convenient means for recovering the second non-aqueous solvent is to condense the second non-aqueous solvent vapor and remove the water from the condensate, after which the recovered second non-aqueous solvent is ready to be recycled into the LiFSI/solvent drying process. Drying the recovered second non-aqueous solvent in the liquid phase can include phase separation (for solvents with low water miscibility), physical adsorption, chemical conversion or a combination of these processes. Suitable physical adsorbents that can be used to dry second non-aqueous solvent include, but are not limited to, molecular sieves, alumina and other desiccants known to those skilled in the art. Exemplary chemical conversion includes reaction with thionyl chloride or calcium hydride. Vapor phase drying of recovered second non-aqueous solvent can also include physical adsorbents and/or chemical reaction. Other solvent drying methods known to those skilled in the art can also be used, such as distillation.

One particular advantage of the process of the invention is that drying recovered second non-aqueous solvent occurs separately from drying the mixture of LiFSI/solvent. In the second non-aqueous solvent drying step, no metal salt is present, thereby enabling the use of low-cost, widely available molecular sieves and zeolites as desiccants. Most common zeolites include alkali metals other than lithium. Attempts to dry lithium salts/solvent solutions using these zeolites often results in cation exchange between the salt and the zeolite, leading to both contamination of the electrolyte with non-lithium alkali metals like sodium or potassium, and loss of lithium from the electrolyte mixture. These problems can be avoided using lithium-exchanged zeolites, but the use of lithium-exchanged zeolites for bulk water removal is not cost-effective.

Figure 3:
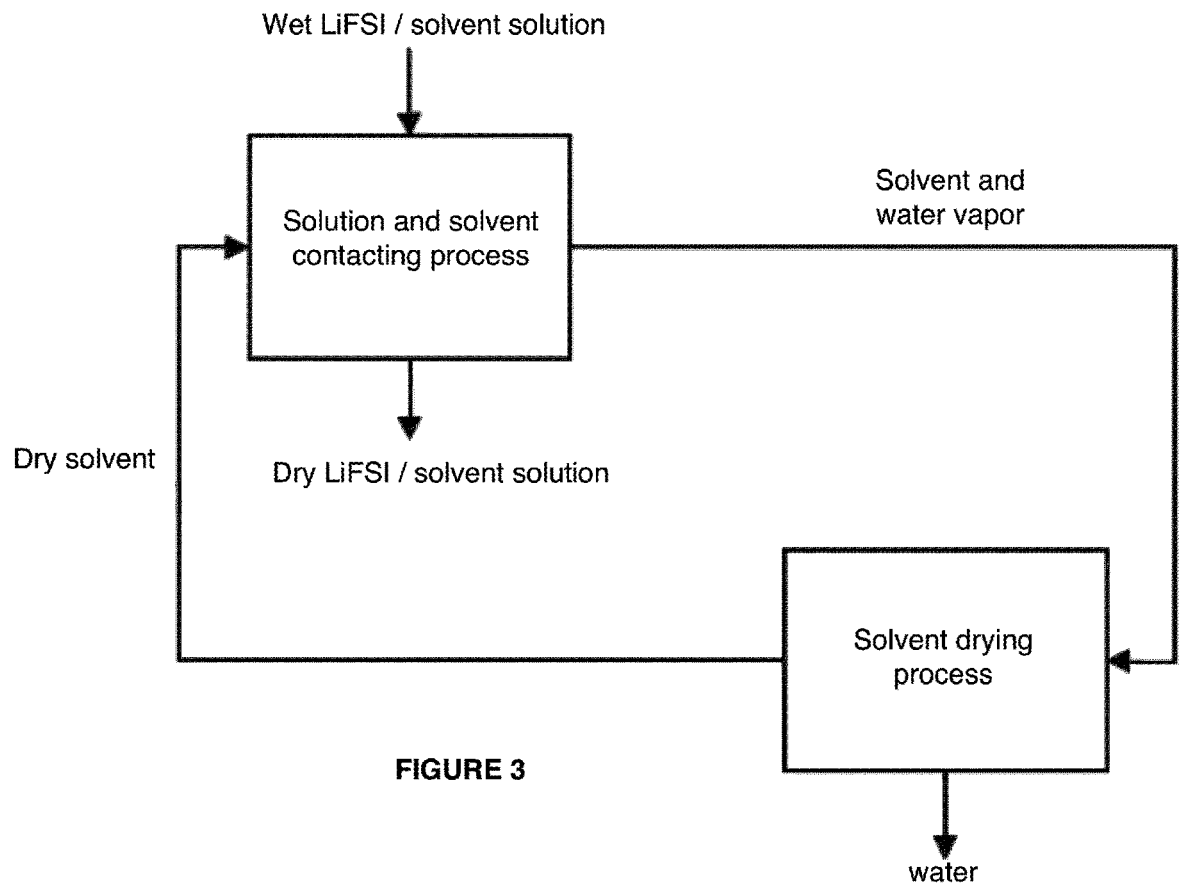
FIG. 3 is a schematic illustration of still yet another embodiment of the invention for continuous removal of water from LiFSI/solvent solutions with solvent recycling.

It is also possible to conduct this invention in a continuous manner for drying LiFSI/solvent/water streams. FIG. 3 shows continuous removal of water from a stream of LiFSI/solvent/water solution that incorporates a continuous solvent drying process for recycling the solvent used for water removal. The contact between the dry solvent and the LiFSI/solvent/water solution can be conducted in stages to achieve sufficient removal of water. In one particular embodiment of the invention, these stages are conducted in a counter-flow staged separator such as a packed column or tray column. In another embodiment, the wet LiFSI/solvent solution is fed to the top of a packed column, and dry solvent vapor is fed to the bottom of the column. As the LiFSI/solvent solution passes down the column, the packing provides good interphase contact between the solution and the solvent vapor passing upwards through the column. In this manner, the water is stripped from the solution and exits the top of the column and the dried LiFSI/solvent solution exits the bottom of the column.

Without being bound to theory, the vapor pressure of the LiFSI/solvent solution at low water concentrations can be approximated by the ideal Raoult's law where the vapor pressure of the solvent in the solution is equal to the product of the solvent mole fraction and its pure component vapor pressure. He et al. (U.S. Pat. No. 9,268,831) showed that for $LiPF_6$ electrolytes, Raoult's law agreed well when the lithium-salt-to-solvent molar ratio is below about 0.3. At higher salt concentrations, however, the measured solution vapor pressure dropped several times below that predicted from Raoult's law. The inventors here have found that maintaining a LiFSI/solvent solution vapor pressure near that predicted by Raoult's law enables vaporization of the solvent and water from the solution and subsequent drying by the method described in this invention under practical conditions. If the salt concentration is too high, the solution vapor pressure drops below practical conditions under which the invention may be practiced.

As an alternative to the production of a low-water-content salt/solvent solution, certain aspects of the invention can be used to produce dry LiFSI powder. Once the water content of the salt/solvent solution has been reduced to the target value (e.g., about 500 ppm or less, typically about 200 ppm or less and often about 100 ppm or less), salt powder can be produced from the dry salt/solvent mixture. A number of methods for producing dry powder from such solutions are known to those skilled in the art. One class of such methods involves evaporating the solvent though various combinations of contacting with a dry gas, heating and exposing to vacuum. These may be practical once the water is removed, because the solution can be heated to higher temperatures without causing degradation of the lithium salt due to interaction with water. Another embodiment of the invention includes adding a liquid which is a poor solubility solvent (an "anti-solvent") for the hygroscopic metal salt (e.g., lithium salt) to the salt/solvent mixture so as to cause the salt to precipitate. Many low-polarity solvents can be used for this step, including without limitation hexane, toluene and dichloromethane. Generally, an anti-solvent refers to a solvent in which the hygroscopic metal salt has a solubility of about 50 g/L or less, typically about 10 g/L or less, and often 1 g/L or less.

Figure 4:
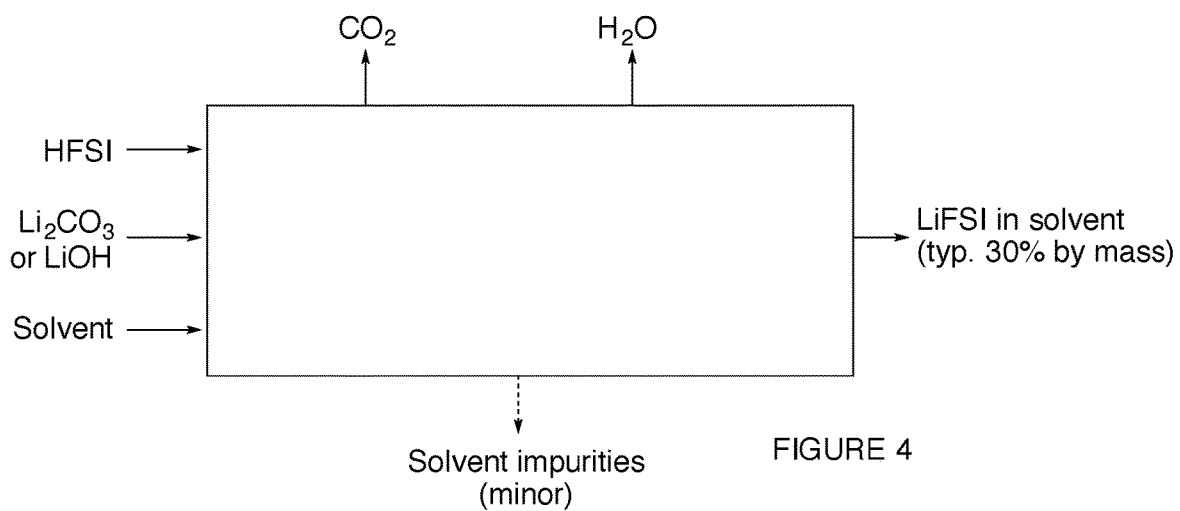
FIG. 4 is a schematic illustration of a particular embodiment of the invention for producing a low water content LiFSI solution from HFSI.

Yet another aspect of the invention provides a method for producing an aprotic electrolyte solution comprising a hygroscopic alkali metal salt. In this aspect of the invention, the method includes admixing (i) a liquid solution comprising an acidic form of the hygroscopic alkali metal salt (e.g., a compound of Formula I) in a first solvent, (ii) an alkali metal base, and (iii) an aprotic electrolyte solvent. See FIG. 4. The admixture is subjected to conditions sufficient to produce a solution mixture where the solution mixture comprises (i) a vapor comprising water, a first solvent or a combination thereof, and (ii) the hygroscopic alkali metal salt. The method also includes a step of removing the vapor from the solution mixture thereby reducing the amount of water in the solution mixture to produce the desired aprotic electrolyte solution.

As can be seen unlike conventional methods, this particular method produces the alkali metal in situ by reacting the acidic form of the electrolyte with an alkali metal base. Suitable alkali metal base include hydroxides, carbonates, and bicarbonates. The resulting reaction produces water and/or carbon dioxide as by products which are removed during the step of removing the vapor. In this manner, the method of the invention avoids having to dry the alkali metal salt of the electrolyte, which is a typical required in conventional methods.

Another aspect of the invention provides a method for producing an electrolyte solution from a liquid solution comprising a mixture of a hygroscopic alkali metal electrolyte, an organic solvent and water. In this aspect of the invention, the method generally includes combining (i) an electrolyte solvent having water content of about 100 ppm or less and (ii) a liquid solution under conditions sufficient to produce an admixture solution and a vapor comprising the organic solvent and water. The vapor is then removed to reduce the amount of the organic solvent (which is typically used in production and/or isolation of the electrolyte) and water from the admixture solution to produce the electrolyte solution having no more than 500 ppm of water by weight. In this method, the electrolyte solvent is added such as to maintain the alkali metal electrolyte concentration below the concentration where the vapor pressure of the admixture solution is more than one-tenth of the product of the vapor pressure of the pure electrolyte solvent and its mole fraction in the admixture solution. As shown in the Examples below, by maintaining this ratio, one can achieve a significantly greater removal of water without requiring a high amount of energy and/or while reducing the amount of time.

Additional objects, advantages, and novel features of this invention will become apparent to those skilled in the art upon examination of the following examples thereof, which are not intended to be limiting. In the Examples, procedures that are constructively reduced to practice are described in the present tense, and procedures that have been carried out in the laboratory are set forth in the past tense.

EXAMPLES

Example 1

A wet solution of LiFSI and diethyl carbonate (DEC) was prepared by mixing 100 g of DEC, 54.6 g LiFSI, and 1.59 g water. The solution was found to have 1.0 wt % water from Karl Fischer titration. This solution was placed in a 1 L three-neck round bottom flask with a magnetic stir bar and a heating mantle. One flask neck was closed with a ported stopper through which a thermocouple was immersed in the LiFSI/DEC solution. Another neck was fitted with a 125 mL pressure equalizing addition funnel filled with 117.5 g DEC having 130 ppm, water as measured by Karl Fischer titration. The final neck was fitted with a vacuum port Liebig distillation head. A 1 L round bottom flask was attached to the receiving end of the distillation head. This receiving flask was immersed in an ice bath. The distillation condenser was cooled to −5° C. with an external chiller. A diaphragm vacuum pump was connected to the vacuum port of the distillation head and the pressure was reduced to about 15 torr.

The LiFSI/DEC solution was heated to 37° C. under constant power from the external heating mantle at which point the solution began to boil and condensate was observed in the receiving flask. The boiling temperature was maintained by slow addition of DEC from the addition funnel. After the addition funnel was emptied, the heating was stopped, the vacuum relieved, and the LiFSI/DEC solution was sampled and found to have 2400 ppm$_w$ water. The addition funnel was filled with 118.0 g DEC, the vacuum was set to about 15 torr and the heater power was applied, and DEC was added to the LiFSI/DEC solution to maintain boiling at about 37° C. After the addition funnel was emptied, the LiFSI/DEC solution was again sampled and found to have 550 ppm$_w$ water. The addition funnel was filled a third time with 107.7 g DEC and the drying process was restarted. After the remaining DEC was added, the final water content in the LiFSI/DEC solution was found to be 190 ppm$_w$. The receiving flask was found to contain 324.1 g DEC including some water droplets visible at the bottom of the flask. The three-neck flask contained 166.6 g LiFSI/DEC solution.

Example 2

A wet solution of LiFSI and ethyl methyl carbonate (EMC) was prepared by mixing 47.2 g LiFSI, 88.6 g EMC and 1.432 g water. The solution was found to have 1.06 wt % water by Karl Fischer titration. 123.0 g of this solution was placed in a 300 mL three-neck round bottom flask with a magnetic stir bar and a heating mantle. The flask was connected to the apparatus described in Example 1. The LiFSI/EMC solution was heated to about 42° C. under constant power from the heating mantle. Vacuum was applied at about 30 torr and the condenser was cooled to about −6° C. Dry EMC was added to the LiFSI/EMC solution from the addition funnel and boiling was observed with condensate collection in the receiving funnel. After the contents of the addition funnel was added, the water content of the LiFSI/EMC solution was measured by Karl Fischer titration and the addition funnel was refilled with dry EMC. Table 1 shows the amount of EMC added and the resulting water concentration in the LiFSI/EMC solution after each of these additions.

TABLE 1

Water content as function of solvent added

| Cumulative mass of EMC added (g) | Water concentration in LiFSI/EMC mixture (ppm) |
|---|---|
| 0 | 10600 |
| 123 | 4400 |
| 242.7 | 1915 |
| 362.4 | 805 |
| 485.7 | 355 |
| 621 | 179.5 |
| 742 | 90.8 |

The final mass of LiFSI/EMC solution in the three-neck flask was 108.3 g. The condensed EMC in the receiving flask was a single phase with a total mass of 738.1 g. The water content of the EMC condensate was 1680 ppm as measured by Karl Fischer titration.

Comparative Example 1

A solution of LiFSI in EC was dried by flowing through a packed column operated at reduced pressure. LiFSI/EC solution with water was fed to the top of a packed column while dry argon gas was fed to the bottom of the column. Approximately 500 grams of solution with an initial concentration of 49% LiFSI, 49% EC and 2% water was passed through the column. Water content in the exit solution was measured using Karl Fischer titration. After passing through the column, the dried solution was returned to the top of the column for additional passes. Nine passes through the column were required to reduce the water content from 10,000 ppm to 2000 ppm. The water removal rate decreased asymptotically for each pass, which severely limits the practicality of this approach. Each pass took more than 30 minutes, for a total of 4.5 hours. Compared to Example 1, this method showed a significantly slower drying rate.

Example 3

A solution of LiFSI in water was prepared by mixing HFSI with lithium carbonate. In a jacketed flask equipped with a mechanical stirrer, 814 grams of water was added with 747 grams of lithium carbonate. 3700 g of HFSI was added dropwise to the reactor over the course of 3.5 hours, while maintaining the reactor temperature below 20° C. by circulating coolant through the jacket. After completing the addition of the HFSI, the reactor contents were drained and filtered, yielding an aqueous solution containing 78% LiFSI by mass. This solution was then mixed with DEC and dried using the methods of Example 1.

Process effluents were $CO_2$, water and a minor solid impurity stream, (typically <1% of the LiFSI production rate). For efficiency, the HFSI feed was of high purity as shown in Table 2. Conversion was nearly quantitative as yields above 95% was achieved.

TABLE 2

HFSI used in Example 3

| Specification | value (ppmw) |
|---|---|
| Fluoride | <1,400 ppm$_w$ |
| Chloride | <150 ppm$_w$ |
| Sulfate | <1,500 ppm$_w$ |
| Fluorosulfate | <1,000 ppm$_w$ |
| Color | Light yellow to colorless |

In this manner, LiFSI salt solution between 20% and 30% by mass was obtained. It should be noted higher concentrations can also be obtained.

Example 4

This example shows a method of drying where a hydrophobic solvent is dried by condensing the vapor and recycling the dry solvent. A LiFSI/$H_2O$ solution was prepared by neutralizing 1099.6 g HFSI in a slurry of 224.3 g $Li_2CO_3$ in 201 g $H_2O$ to yield a 77.4 wt % LiFSI solution. The solution was filtered to remove minor solid byproducts. Then, 408.4 g of the filtered solution and 924.0 g diethylcarbonate were added to a 2 L multi-neck round bottom flask with a magnetic stir bar, a thermometer, and a 5-inch vigreaux distillation column. Above the column was a condenser and a receiving vessel that allowed phase separation of the condensate and return of the dry solvent to the top of the distillation column. The head space of the condenser was connected to a diaphragm vacuum pump. The condenser was cooled to about 0° C., and the receiving vessel was immersed in a water/ice bath. The flask was heated at constant power with a heating mantle, the pressure was reduced to about 6 to 15 torr, and the solution was boiled at between about 28 and 37° C. with periodic draining of water from the receiving vessel. After 7 hours the water content of the solution in the flask was 65 ppm by Karl Fisher titration. The solution was filtered and returned to the apparatus and distilled under the column and condenser for another 2.5 hours and the water content was 24 ppm. A larger receiving vessel was placed on the condenser and 304.7 g excess diethylcarbonate was removed from the solution. 756.5 g of LiFSI/diethylcarbonate solution was recovered having a water content of 21 ppm, and a LiFSI concentration of 42 wt %.

The foregoing discussion of the invention has been presented for purposes of illustration and description. The foregoing is not intended to limit the invention to the form or forms disclosed herein. Although the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter. All references cited herein are incorporated by reference in their entirety.

What is claimed is:

1. A method for producing a non-aqueous electrolyte solution comprising a hygroscopic alkali metal salt, said method comprising:
   (a) admixing (i) an acid comprising the anion of said alkali metal salt (ii) an alkali metal base, and (iii) a non-aqueous solvent under conditions sufficient to produce a solution mixture comprising:
      said non-aqueous solvent,
      water, and
      an alkali metal salt produced from a reaction between said acid and said alkali metal base;
   (b) removing a vapor comprising water from said solution mixture to produce said non-aqueous electrolyte solution;
   (c) adding additional amount of said non-aqueous solvent to said non-aqueous electrolyte solution produced in said step (b) and repeating said step (b).

2. The method of claim 1, wherein said non-aqueous solvent is selected from the group consisting of an acyclic carbonate, a cyclic carbonate, an acyclic ether, a cyclic ether, an ionic liquid, water and a mixture thereof.

3. The method of claim 1, wherein the additional amount of said non-aqueous solvent is added continuously.

4. The method of claim 1, wherein the additional amount of said non-aqueous solvent is added batch-wise.

5. The method of claim 1, wherein the additional amount of said non-aqueous solvent comprises said non-aqueous solvent that is recovered from said vapor.

6. The method of claim 1, wherein said non-aqueous electrolyte solution comprises no more than 1000 ppm of water by weight.

7. The method of claim 1, wherein the amount of said non-aqueous electrolyte solvent added to said admixture is sufficient to maintain said hygroscopic alkali metal salt concentration below the concentration where the vapor pressure of the resulting solution mixture is more than one-tenth of the product of the vapor pressure of the pure non-aqueous electrolyte solvent and its mole fraction in said solution mixture.

8. The method of claim 1, wherein said alkali metal base comprises alkali metal carbonate, alkali metal hydroxide, alkali metal bicarbonate, or a combination thereof.

9. The method of claim 1, wherein said non-aqueous electrolyte solvent comprises a cyclic carbonate, a cyclic ester, or a combination thereof.

10. The method of claim 1, wherein said hygroscopic alkali metal salt is of the formula: $R^1$—$SO_2$—$N(M^1)$-$SO_2$—$R^2$, wherein $M^1$ is an alkali metal, and each of $R^1$ and $R^2$ is independently selected from the group consisting of fluoride and a fluorinated $C_{1-6}$ alkyl.

11. A method for producing a non-aqueous electrolyte solution comprising a hygroscopic alkali metal salt and about 1000 ppm or less of water, said method comprising:
   (a) admixing (i) a non-aqueous electrolyte solvent and (ii) a liquid solution comprising said hygroscopic alkali metal salt and water under conditions sufficient to produce an admixture solution and a vapor comprising said electrolyte solvent and water;
   (b) removing said vapor to reduce the amount of said water from said admixture solution to produce said electrolyte solution;
   (c) adding an additional amount of said non-aqueous electrolyte solvent to said electrolyte solution produced in said step (b), wherein the amount of said non-aqueous-electrolyte solvent added is sufficient to maintain said alkali metal electrolyte concentration below the concentration where the vapor pressure of said admixture solution is more than one-tenth of the product of the vapor pressure of the pure non-aqueous electrolyte solvent and its mole fraction in said admixture solution; and
   (d) repeating said steps (b) and (c) to produce said non-aqueous electrolyte solution.

12. The method of claim 11, wherein said non-aqueous electrolyte solvent has a water content of about 100 ppm or less.

13. The method of claim 11 further comprising the step of recovering at least a portion of said electrolyte solvent from said vapor by removing at least a portion of said water that is present in said vapor.

14. The method of claim 13, wherein the step of removing water from said vapor comprises phase separation, distillation, adsorption, extraction, membrane separation, chemical reaction, or a combination thereof.

15. The method of claim 13, wherein the additional amount of said non-aqueous electrolyte solvent added in said step (c) comprises at least a portion of said recovered electrolyte solvent from said vapor.

16. The method of claim 11, wherein said steps (b)-(d) is a continuous process.

17. The method of claim 11, wherein said steps (b)-(d) is a batch-wise process.

18. The method of claim 11, wherein the temperature of said admixture solution is maintained a temperature of about 50° C. or less.

19. The method of claim 11, wherein said alkali metal electrolyte comprises a lithium salt, a sodium salt, potassium salt, rubidium salt, cesium salt, francium salt, or a combination thereof.

20. The method of claim 11, wherein said hygroscopic alkali metal electrolyte salt is lithium bis(fluorosulfonyl)imide.

21. The method of claim 11, wherein said electrolyte solvent is selected from the group consisting of an acyclic carbonate, a cyclic carbonate, an acyclic ether, a cyclic ether, an ionic liquid, and a mixture thereof.

22. The method of claim 11, wherein said vapor is removed from said admixture solution at a pressure between 0.01 torr and about 500 torr.

23. The method of claim 11, wherein said vapor is removed from said admixture solution at temperature between about 10° C. and about 80° C.

24. A method for producing an aprotic electrolyte solution comprising lithium bis(fluorosulfonyl)-imide ("LiFSI"), said method comprising:
(a) combining (i) hydrogen bis(fluorosulfonyl)imide ("HFSI"), (ii) an aprotic solvent, and (iii) a lithium base under conditions sufficient to produce a solution mixture comprising LiFSI and a vapor comprising water; and
(b) removing said vapor from said solution mixture to produce said aprotic electrolyte solution having no more than 1000 ppm of water.

25. The method of claim 24, wherein said aprotic solvent comprises diethyl carbonate (DEC), ethylmethyl carbonate (EMC), ethylene carbonate (EC), acetonitrile, methanol, ethanol, or a mixture thereof.

26. The method of claim 25, wherein the amount of water present in said aprotic electrolyte solution is less than the total amount of water produced from the reaction between said HFSI and said lithium base.

27. The method of claim 26, wherein said lithium base comprise lithium hydroxide, lithium carbonate, lithium bicarbonate, or a combination thereof.

28. The method of claim 26, wherein the amount of said aprotic solvent added in said step (a) is sufficient to maintain the concentration of LiFSI below the concentration where the vapor pressure of said solution mixture is more than one-tenth of the product of the vapor pressure of the pure aprotic solvent and its mole fraction in said solution mixture.

* * * * *